United States Patent Office 2,978,431
Patented Apr. 4, 1961

2,978,431

COMPOSITION CONTAINING POLYETHYLENE AND A POLYPROPYLENE GLYCOL MONO-ALKYL ETHER

James D. Engle, Torrance, Calif., assignor to Union Carbide Corporation, a corporation of New York No Drawing. Filed Nov. 20, 1956, Ser. No. 623,511

7 Claims. (Cl. 260—33.2)

This invention relates to polyethylene compositions and more particularly to polyethylene compositions having a lower coefficient of friction.

Conventional polyethylene films have poor slip behavior and consequently their use in automatic processing equipment presents something of a problem since the film must pass freely through the fabricating machine for proper and reproducible operation. A convenient measure of a film's slip behavior is its coefficient of friction as determined by the moving sled stationary film method subsequently described. Different specimens of film heretofore available have coefficients of friction ranging from about 0.4 to about 0.9, with a high percentage of the values falling above 0.6.

It has now been found that the addition to a normally solid polyolefin of from about 0.005% to about 0.5% by weight of a polypropylene glycol monoalkyl ether having an average molecular weight of from about 750 to about 3000, wherein the alkyl group may contain up to about 6 carbon atoms and preferably 3 or 4 carbon atoms, improves the slip behavior of the polyolefin. The slip agents suitable as lubricants in this invention may be represented by the following general formula:

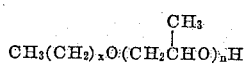

wherein $x$ represents an integer having a value of from 0 to about 6 and $n$ represents an integer having a value of from about 12 to about 52. Among the polypropylene glycol monoalkyl ethers suitable for use in this invention are the methyl, ethyl, propyl, butyl, pentyl and hexyl ethers.

The polypropylene glycol monoalkyl ethers suitable in this invention are those having average molecular weights from about 750 to about 3000; preferably from about 1000 to about 1750 with the most preferred molecular weights being from about 1200 to about 1500. The presence of small amounts, up to about 5% by weight, of inhibitors such as phenyl alpha naphthylamine in the lubricant can be tolerated without causing any appreciable deleterious effects on the properties of the film.

The amount of lubricant added to the polyethylene may be varied from about 0.005% to about 0.5% by weight of the polyethylene. Preferably from about 0.01 to about 0.1% by weight of lubricant is added, with the most preferred amount ranging from about 0.025% to about 0.05% by weight.

The lubricant may be added to the normally solid polyethylene by any suitable means. For example, it may be added after the polyethylene has been produced to the pelleted or powdered polymer such as by tumbling or spraying; or it may be added to the ethylene feed prior to polymerization thereof. It has been found that this latter technique is preferred since better contact of lubricant with polymer can be achieved. It has also been established by infrared studies of polymer samples produced with lubricant added to the ethylene feed that the lubricant does not react with the ethylene during the polymerization but is simply entrained per se in the finished polymer.

Concentrations of polypropylene glycol monobutyl ether of about 0.04% by weight in polyethylene served to reduce the coefficient of friction about 40% or greater without significantly influencing other properties such as haze, glass, fish-eye rating, appearance, impact strength, drawdown thickness, and drawdown speed. At concentrations above about 0.2% by weight the surface of the film tends to become oily and this may cause blocking difficulties. By blocking is meant that two films separated by a thin layer of oil are held firmly together by cohesive forces and thus require excess perpendicular forces for separation.

In addition to the lubricants herein described the polyethylene may also contain other additives normally employed to stabilize the polymer against heat and light degradation, or to color the polymer.

The moving sled stationary film method for determining the coefficient of friction is as follows:

A 16" x 18" sample of film is taped smoothly to the surface of a level plane with the machine direction of the film in the direction of sled travel. Care is taken to remove all wrinkles without causing any elongation of the film. A smaller specimen of the film is attached to a sled consisting of a steel block 7/8" x 2 3/8" x 4" mounted on a rubber base which has a total weight of one kilogram. The sled is attached to a synchronous motor by means of a tow line with the tow line passing through a gage which in turn is connected to a microammeter in which the microammeter scale has been replaced with a coefficient of friction scale reading from 0 to 1, with 1 corresponding to a full scale reading of the meter (30 microamps). The film-covered sled is placed on the level plane and pulled by the motor. The coefficient of friction is read directly from the scale after the sled has traveled 1, 2 and 3 inches and the average of these three values is taken. The test is then repeated with another two small specimens of the film on the sled and the average taken for the three test specimens examined is reported as the coefficient of friction.

The following examples further serve to illustrate the invention.

*Example 1*

Ethylene, containing about 75 parts per million by volume of oxygen, was compressed to about 32,000 p.s.i. During the compression, when the pressure was about 2000 p.s.i., polypropylene glycol monobutyl ether having an average molecular weight of about 1200 was added to the ethylene to give a concentration of about 49 parts per million of the glycol ether lubricant in the ethylene. This mixture was passed through a jacketed tubular reactor about 460 feet long having an inside diameter of about one-half inch at a rate of about 1800 pounds per hour and at a reactor temperature of 240° C. and a reactor pressure of about 32,000 p.s.i. After passing through the reactor the liquid polymer and unreacted ethylene were discharged intermittently through a suitable control valve to a heated separating vessel where the polymer was separated from the unreacted ethylene which was recovered and recycled. The molten polymer was extruded into water to cool and solidify and recovered therefrom. The resin had a melt index of 1.4 dgm./min. (A.S.T.M. D–1238–52T) and a density of 0.9175 gram/cc. (Hunter and Oaks, Trans. Far. Soc. 41, 49). The polymer was then extruded as a flat film 1.5 mils thick. The coefficient of friction determined by the moving sled stationary film method was 0.34. A control sample produced by the same method without any lubricant added to the ethylene feed had a coefficient of friction of 0.7. This control sample had a melt index of 2.0 dgm./min. and a density of 0.9190 gram/cc.

Additional samples were produced under similar conditions in which the amount of lubricant was varied; these are summarized below:

| Run | A | B |
| --- | --- | --- |
| Lubricant, p.p.m. | 119 | 368 |
| Coefficient of friction | 0.23 | 0.20 |
| Melt index, dgm./min | 1.7 | 2.2 |
| Density, g./cc | 0.9164 | |

*Example 2*

Ethylene was polymerized in the same manner as described in Example 1 using a polypropylene glycol monobutyl ether having an average molecular weight of about 2500 as lubricant. The results are summarized below:

| Run | Control | A | B |
| --- | --- | --- | --- |
| Lubricant, p.p.m. | 0 | 780 | 1,560 |
| Coefficient of friction | 0.70 | 0.60 | 0.51 |
| Melt index, dgm./min | 2.0 | 2.0 | 1.4 |
| Density, g./cc | 0.9190 | 0.9170 | 0.9164 |

*Example 3*

Ethylene was polymerized in the same manner as described in Example 1 using a polypropylene glycol monobutyl ether having an average molecular weight of about 1200 and containing therein about 2 percent phenyl alpha naphthylamine therein as inhibitor. The results are summarized below:

| Run | Control | A | B | C | D |
| --- | --- | --- | --- | --- | --- |
| Reactor temperature, °C | 240 | 230 | 230 | 195 | 195 |
| Lubricant, p.p.m. | 0 | 775 | 1,550 | 775 | 1,550 |
| Coefficient of friction | 0.70 | 0.16 | 0.16 | 0.35 | 0.38 |
| Melt index, dgm./min | 2.0 | 2.8 | 1.8 | 1.7 | 2.5 |
| Density, g./cc | 0.9190 | 0.9174 | 0.9176 | 0.9196 | 0.9190 |

*Example 4*

Polyethylene having a melt index of about 2 dgm./min. and a density of about 0.917 g./cc. was extruded to form pellets of about ⅛ inch diameter. The pellets were then treated in a double-cone blender with various amounts of polypropylene glycol monobutyl ether having an average molecular weight of about 1200. The lubricant-containing pellets were then extruded in a flat film extruder to produce film about 1.5 mils thick. Results are summarized below:

| Run | Control | A | B | C | D | E |
| --- | --- | --- | --- | --- | --- | --- |
| Lubricant, p.p.m. | 0 | 50 | 100 | 200 | 400 | 1,000 |
| Coefficient of friction | 0.47 | 0.42 | 0.35 | 0.30 | 0.27 | 0.25 |

*Example 5*

Polyethylene pellets as described in Example 4 were sprayed with various amounts of polypropylene glycol monobutyl ether having an average molecular weight of about 1200. The pellets were then extruded in a flat film extruder to produce film about 1.5 mils thick. Results are summarized below:

| Run | A | B |
| --- | --- | --- |
| Lubricant, p.p.m. | 400 | 4,000 |
| Coefficient of friction | 0.40 | 0.23 |

What is claimed is:

1. A homogeneous composition of matter consisting essentially of a normally solid polyethylene and from about 0.005% to about 0.5% by weight of the polyethylene of a polypropylene glycol monoalkyl ether represented by the general formula:

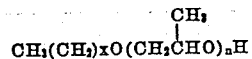

wherein $x$ represents an integer having a value of from 0 to about 6 and $n$ represents an integer having a value of from about 12 to about 52.

2. A homogeneous composition of matter consisting essentially of a normally solid polyethylene and from about 0.01% to about 0.1% by weight of the polyethylene of a polypropylene glycol monoalkyl ether represented by the following general formula:

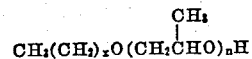

wherein $x$ represents an integer having a value of from 0 to about 6 and $n$ represents an integer having a value of from about 12 to about 52.

3. A homogeneous composition of matter consisting essentially of a normally solid polyethylene and from about 0.005% to about 0.5% by weight of the polyethylene of a polypropylene glycol monobutyl ether, said ether having a molecular weight of from about 750 to about 3000.

4. A homogeneous composition of matter consisting essentially of a normally solid polyethylene and from about 0.01% to about 0.1% by weight of the polyethylene of a polypropylene glycol monobutyl ether having an average molecular weight of from about 750 to about 3000.

5. A homogeneous composition of matter consisting essentially of a normally solid polyethylene and from about 0.01% to about 0.1% by weight of the polyethylene of a polypropylene glycol monobutyl ether having an average molecular weight of from about 1000 to about 1750.

6. A homogeneous composition of matter consisting essentially of a normally solid polyethylene and from about 0.025% to about 0.1% by weight of the polyethylene of a polypropylene glycol monobutyl ether having an average molecular weight of about 1200.

7. A homogeneous composition of matter consisting essentially of a normally solid polyethylene and about 0.04% by weight of the polyethylene of a polypropylene glycol monobutyl ether having an average molecular weight of about 1200.

References Cited in the file of this patent

UNITED STATES PATENTS

| | | |
| --- | --- | --- |
| 2,293,868 | Toussaint | Aug. 25, 1942 |
| 2,353,228 | Ducca | July 11, 1944 |
| 2,448,664 | Fife et al. | Sept. 7, 1948 |
| 2,510,540 | Ballard | June 6, 1950 |
| 2,519,013 | Banigan | Aug. 15, 1950 |
| 2,520,733 | Morris | Aug. 29, 1950 |
| 2,579,375 | Eisen | Dec. 18, 1951 |
| 2,668,801 | Schultz | Feb. 9, 1954 |
| 2,718,509 | Lundsted et al. | Sept. 20, 1955 |
| 2,728,755 | Weisemann | Dec. 27, 1955 |

FOREIGN PATENTS

| | | |
| --- | --- | --- |
| 601,419 | Great Britain | May 5, 1948 |